J. S. PURDY.
PICKET POINTER.
APPLICATION FILED JULY 5, 1913.
1,109,147.
Patented Sept. 1, 1914.
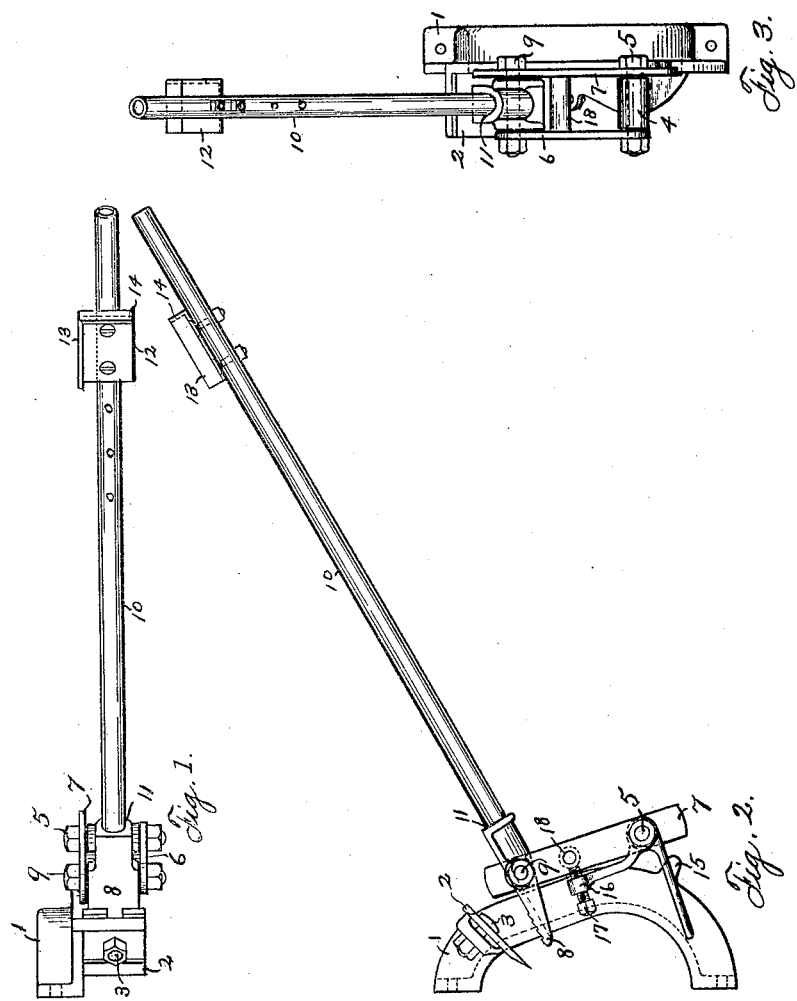
WITNESSES:
May Montgomery
Kathleen Clippinger
INVENTOR
John S. Purdy
BY
Hardway & Cathey
ATTORNEYS.

UNITED STATES PATENT OFFICE.

JOHN S. PURDY, OF HOUSTON HEIGHTS, TEXAS.

PICKET-POINTER.

1,109,147.
Specification of Letters Patent.
Patented Sept. 1, 1914.

Application filed July 5, 1913. Serial No. 777,532.

*To all whom it may concern:*

Be it known that I, JOHN S. PURDY, a citizen of the United States, residing at Houston Heights, in the county of Harris and State of Texas, have invented certain new and useful Improvements in Picket-Pointers, of which the following is a specification.

This invention relates to new and useful improvements in a picket pointer.

The object of the invention is to provide a device of the character described whereby the pickets used in the construction or woven wire picket fences may be sharpened or beveled at one end uniformly and with ease and despatch.

With the above and other objects in view, the invention has particular relation to certain novel features of construction, operation and arrangement of parts, an example of which is given in this specification and illustrated in the accompanying drawings, wherein—

Figure 1 is a plan view of the device. Fig. 2 is a side elevation thereof, and Fig. 3 is an end elevation thereof.

Referring now more particularly to the drawings wherein like numerals of reference designate similar parts in each of the figures, the numeral 1 refers to a U-shaped casting forming the frame work of the device and which is adapted to be secured to a suitable stationary support. Upon the side of this frame work, near one end thereof is secured a blade 2. This blade is secured in position and may be adjusted in accordance with the desired angle of the point of the picket. The other end of the frame work has a suitable bearing 4 integral therewith and passing through this bearing 4 is a bolt 5 which also passes through suitable holes in the links 6 and 7. These links are secured in position by means of said bolt, one end of which has an integral head and the other end of which has a nut threaded thereon. The other, or upper ends of the links 6 and 7 embrace the dog 8, one being arranged on each side and passing through said ends of said links and also through an alined bearing in said dog is a bolt 9, one end of which has an integral head and upon the other end of which is threaded a nut so as to hold said links in position relative to said dog. This dog is arranged to oppose the blade 2 and is spaced a distance therefrom and its top facing the blade is provided with sharp teeth for a purpose to be hereinafter set forth.

A handle 10 is provided, one end of which is inserted in the socket 11 of the dog 8 and by means of which said dog is manipulated. Secured upon the handle near its free end is a guide plate 12 which can be adjusted for different lengths of pickets. One side and the outer end of this plate is provided with upstanding flanges numbered respectively 13 and 14.

In operation the pickets are placed side by side, the outer ends resting upon the plate 12 and against the flange 14. The other ends of these pickets rest upon the dog 8 and project between the same and the blade 2. The handle 10 and the pickets carried thereby are then forced downwardly so as to bring the ends of the pickets against the sharp edge of said blade, the dog 8 operating upon its pivotal support and the links 6 and 7 operating upon the bolt 5 as a pivot. The blade 2 is set at such an angle with reference to the handle 10 that the corners of the pickets will be cut off by said blade, and the blade is of sufficient width to cut off all the corners of the pickets carried by the plate 12. The position of the pickets is then reversed, the other edges being placed toward the handle 10, the operation completed and the other corners of said pickets cut off. In forcing the pickets against the blade 2 the cutting edge enters the side of the picket and follows the arc of a circle whose radius is very nearly equal to the distance from the pivot point of the bolt 5 to the cutting edge of the blade 2. The point of the picket will be the intersection of two arcs of two equal circles.

The upper side of the dog facing the blade 2 is provided with ratchet teeth which engage with said pickets and prevent them from slipping during the operation of the device.

The link 7 projects upwardly beyond the bolt 9 and downwardly beyond the bolt 5, the upwardly projecting end of said link, together with the flange 13 forming side braces for the pickets during the operation of the device, and the lower projecting end of said link 7 limiting the rearward movement of the handle 10 by coming in contact with the lug 15, projecting outwardly from the frame work 1. Projecting laterally from the frame work 1 is a bearing member 16 which has a tapped hole extending therethrough through which the outwardly threaded bolt 17 is screwed whose end is in alinement with a cross bar 18 carried by the links 6 and 7. The adjustment of the bolt 17 in its bearing 16 determines the position of the dog 8 just before the blade enters the pickets and consequently determines the curve at which the corners of the pickets are taken off.

What I claim is:—

1. A device of the character described, including a frame, a cutting blade fixed to said frame, a pair of links pivoted to the frame at one end, a dog between the other ends of said links pivoted thereto and arranged to oppose said blade and spaced therefrom, an adjustable member carried by the frame for engaging and limiting the movement of said links and the dog carried thereby, a handle secured to said dog for manipulating the same and a supporting plate secured to said handle near its free end.

2. A device of the character described including a frame, a cutting blade fixed to said frame, a pair of links pivoted to the frame at one end, a dog between the other ends of said links pivoted thereto and arranged to oppose said blade and spaced therefrom, one end of one of said links projecting upwardly beyond said dog and forming a lateral brace, a handle secured to said dog for manipulating the same and a supporting plate secured to said handle near its free end.

3. A device of the character described, including a frame, a cutting blade fixed to said frame, a pair of links pivoted to the frame at one end, a dog between the other ends of said links pivoted thereto and arranged to oppose said blade and spaced therefrom, one end of one of said links projecting upwardly beyond said dog and forming a lateral brace, means for regulating the position of said dog, a handle secured to said dog for manipulating the same and a supporting means secured to said handle near its free end.

In testimony whereof I have signed my name to this specification in the presence of two subscribing witnesses.

JOHN S. PURDY.

Witnesses:
MAY MONTGOMERY,
J. C. CARPENTER.

Copies of this patent may be obtained for five cents each, by addressing the "Commissioner of Patents, Washington, D. C."